United States Patent
Wang et al.

(10) Patent No.: US 9,438,124 B2
(45) Date of Patent: Sep. 6, 2016

(54) POWER SUPPLY CIRCUIT

(71) Applicant: TDK Corporation, Minato-ku, Tokyo (JP)

(72) Inventors: YueQing Wang, Shaghai (CN); Honglei Wang, Shanghai (CN)

(73) Assignee: TDK Corporation (JP)

( * ) Notice: Subject to any disclaimer, the term of this patent is extended or adjusted under 35 U.S.C. 154(b) by 117 days.

(21) Appl. No.: 14/269,258

(22) Filed: May 5, 2014

(65) Prior Publication Data

US 2014/0328088 A1    Nov. 6, 2014

(30) Foreign Application Priority Data

May 6, 2013   (CN) .......................... 2013 1 0162805
Apr. 30, 2014  (CN) .......................... 2014 1 0181689

(51) Int. Cl.
*H02M 3/335* (2006.01)

(52) U.S. Cl.
CPC ..... *H02M 3/33561* (2013.01); *H02M 3/33507* (2013.01)

(58) Field of Classification Search
USPC .............. 363/20, 21.04, 21.05, 21.07, 21.08, 363/21.09, 21.1, 21.11, 21.12, 21.13, 21.15, 363/21.16, 21.17, 21.18, 67, 125, 126
See application file for complete search history.

(56) References Cited

U.S. PATENT DOCUMENTS

| | | | | |
|---|---|---|---|---|
| 4,754,385 A | * | 6/1988 | McDade | H02M 3/3353 363/16 |
| 5,621,625 A | * | 4/1997 | Bang | H02M 1/32 363/21.1 |
| 7,359,221 B2 | * | 4/2008 | Knill | H02M 1/32 363/21.12 |
| 7,825,535 B2 | * | 11/2010 | Huang | H02M 3/337 307/17 |
| 2004/0257838 A1 | | 12/2004 | Gan et al. | |
| 2009/0256423 A1 | | 10/2009 | Kyono | |

FOREIGN PATENT DOCUMENTS

| | | |
|---|---|---|
| CN | 1574580 A | 2/2005 |
| CN | 101278468 A | 10/2008 |
| CN | 102638181 A | 8/2012 |
| CN | 102969902 A | 3/2013 |
| JP | 05-015152 A | 1/1993 |
| JP | 2007267450 A | 10/2007 |

* cited by examiner

*Primary Examiner* — Timothy J Dole
*Assistant Examiner* — Bryan R Perez
(74) *Attorney, Agent, or Firm* — Harness, Dickey & Pierce, P.L.C.

(57) ABSTRACT

A power supply circuit includes a plurality of output terminals that output voltages (voltages may have the same or different voltage values among the output terminals), and a transformer that has a plurality of output windings. First and second output windings of the plurality of output windings are coupled to each other. The first and second output windings have the same number of turns. First terminals, which have a first polarity, of the first and second output windings are connected to each other via a capacitor. Further, second terminals, which have a second polarity opposite to the first polarity, of the first and second output windings are electrically connected to each other. The second terminals of the first and second output windings may be directly connected to each other.

17 Claims, 17 Drawing Sheets

POWER SUPPLY CIRCUIT

CROSS-REFERENCE TO RELATED APPLICATIONS

This application claims priority to Chinese Patent Application Nos. 201310162805.1 filed May 6, 2013, and 201410181689.2 filed Apr. 30, 2014, which are hereby expressly incorporated by reference herein in their entirety.

BACKGROUND

The present invention relates to a power supply circuit. Particularly, the present invention relates to a power supply circuit in which cross-regulation problems (cross-regulation) are improved.

In a switching power supply device, an output voltage is monitored by comparing it with a reference voltage in an error amplifier. Thus, output from a power supply circuit is controlled so as to consistently output a correct voltage. When the switching power supply device has a single output, there is no problem monitoring the output voltage. However, when the switching power supply device has a plurality of outputs, there is a problem. That is, when one output is monitored for stabilizing an output voltage, an output voltage of another output may not be stabilized. Specifically, when a load variation occurs in an output in which the output stabilization is monitored, it affects another output that commonly uses a primary winding (coil). This phenomenon is referred to as cross-regulation. Cross-regulation is one well-known problem of a multiple-output power supply. The cross-regulation is determined based on an actual output voltage regulation with respect to a reference voltage of an output terminal.

A switching power supply device that has two or more output terminals is widely used. However, it is known that voltage regulation may deteriorate when there is a big difference between powers that are output from the output terminals. FIG. 1 shows a conventional two-output flyback power supply device (circuit) 1. The power supply device 1 is configured with a primary coil (winding) Np, a first output coil (a secondary coil) Ns1, a second output coil (the secondary coil) Ns2, a switching element Q1, a control circuit Ic (not shown), and rectifying devices (diodes) D1 and D2. Specifically, the first output coil Ns1 and the second output coil Ns2 are coupled to each other. The switching element Q1 is connected in series to the primary coil Np. The control circuit Ic controls the switching element Q1. The rectifying device (the diode) D1 supplies electric power to a first output terminal Vo1. Further, the rectifying device (the diode) D2 supplies electric power to a second output terminal Vo2.

In the power supply device 1 explained above, an output voltage of the first output terminal Vo1 is typically monitored (feedback control) and a duty of the switching element (transistor) Q1 is adjusted so as to stabilize the output voltage value. An output voltage of the second output terminal Vo2 is not usually monitored (feedback control). As a result, when there is a big difference between the output voltages (electric power) of the output terminals, there is a possibility that a voltage regulation of the output terminal (here, the second output terminal Vo2) for which the feedback control is not performed increases.

In a circuit shown in FIG. 1, the output voltage of the first output terminal Vo1 corresponds to 10V (with the feedback control). Further, a load for the first output terminal Vo1 corresponds to 0.1 A-20 A. The output voltage of the second output terminal Vo2 corresponds to 5V (without the feedback control). Further, a load for the second output terminal Vo2 corresponds to 5 A (a fixed value). In this case, FIG. 2 shows the output voltages of the first and second terminals Vo1 and Vo2, and a voltage variation of the second terminal Vo2. As shown in FIG. 2, the second output terminal Vo2 is very unstable and the output voltage is significantly changed in a range of 3V to 6V.

In order to resolve the deterioration of the voltage regulation explained above and to stabilize output voltage, a technique has been adopted in which the load is artificially increased by, for example, a dummy resistor. However, in this case, a deterioration of power conversion efficiency cannot be avoided.

SUMMARY

The present invention attempts to solve the problems explained above. An object of the present invention is to provide a power supply circuit that can suppress power conversion efficiency deterioration and that can improve the voltage regulation.

To achieve the above object, a power supply circuit according to one aspect of the present invention includes: a plurality of output terminals that output voltages (voltages may have the same or different voltage values among the output terminals); and a transformer that has a plurality of output windings, the plurality of output windings including first and second output windings that are coupled to each other. First terminals of the first and second output windings are connected to each other via a capacitor, and each of the first terminals has a first polarity. Second terminals of the first and second output windings are electrically connected to each other, and each of the second terminals has a second polarity which is opposite to the first polarity. The first and second output windings have the same number of turns between the first and second terminals. According to a configuration discussed above, it is possible to improve cross-regulation between a plurality of output terminals and to decrease voltage regulation.

In the power supply circuit according to the aspect of the present invention, the second terminals are directly connected to each other. Further, the first output winding has a center tap (an intermediate tap; it is not limited a location of the tap in the center) to make a number of turns of the first output winding between the center tap and one of the first and second terminals of the first output winding be equal to a number of turns of the second output winding between the first and second terminals of the second output winding. Similarly, an additional winding is added to an original number of turns of the first output winding to make a sum of the original number of turns of the first output winding and the additional winding equal to a number of turns of the second output winding. According to a configuration discussed above, it is easy to connect a cross capacitor to various types of power supply circuits. Thus, the cross-regulation is improved.

In the power supply circuit according to the aspect of the present invention, the first and second output windings respectively have first and second center taps as the first terminals. According to a configuration discussed above, it is easy to configure the two-output power supply circuit that has good cross-regulation.

A power supply circuit according to another aspect of the present invention includes: a plurality of output terminals that output voltages (voltages may have the same or different voltage values among the output terminals); and a transformer that has a plurality of output windings, the output windings including first, second and third output windings that are coupled to each other. Each of the first through third output windings has a first terminal and a second terminal, each of the first terminals has a first polarity, and each of the second terminals has a second polarity opposite to the first polarity. The first output winding has first and second center taps, each of the first and second center taps functioning as the first terminal. The first terminal of the second output winding is connected to the first center tap so that a number of turns of the second output winding is equal to a number of turns between the second terminal and the first center tap of the first output winding. The first terminal of the third winding is connected to the second center tap so that a number of turns of the third output winding is equal to a number of turns between the second terminal and the second center tap of the first output winding. Further, the second terminals of the first through third output windings are electrically connected to each other. According to a configuration discussed above, it is easy to configure the three-output power supply circuit that has good cross-regulation.

A power supply circuit according to another aspect of the present invention includes: a plurality of output terminals that output voltages (voltages may have the same or different voltage values among the output terminals); and a transformer that has a plurality of output windings, the output windings including first, second and third output windings that are coupled to each other. Each of the first through third output windings has a first terminal and a second terminal, each of the first terminals has a first polarity, and each of the second terminals has a second polarity opposite to the first polarity. The first through third output windings respectively have first through third center taps, and the first through third center taps being the first terminals. A number of turns between the second terminal of the first output winding and the first center tap, a number of turns between the second terminal of the second output winding and the second center tap, and a number of turns between the second terminal of the third output winding and the third center tap are the same. Any two of the first through third center taps are connected via a capacitor. Further, the second terminals of the first through third output windings are electrically connected to each other. According to a configuration discussed above, it is easy to configure the three-output power supply circuit that has good cross-regulation.

In the power supply circuit according to the aspect of the present invention, at least one of the plurality of output windings is performed by feedback control. According to a configuration discussed above, because the voltage regulation for an output terminal in which the feedback control is not performed decreases, the cross-regulation can be improved.

In the power supply circuit according to the aspect of the present invention, the power supply circuit is one of a flyback circuit and a forward circuit. According to a configuration discussed above, because the cross capacitor can be connected to various types of power supply circuits, the cross-regulation can be improved.

In the power supply circuit according to the aspect of the present invention, the plurality of output windings are output mutual inductances. According to a configuration discussed above, because the cross capacitor can be connected to the power supply circuit in which their outputs are the output mutual inductances, the cross-regulation can be improved.

The power supply circuit according to the aspect of the present invention can improve the cross-regulation of the power supply circuit by adding only a normal capacitor element without largely changing a configuration of the power supply circuit.

DESCRIPTION OF EXEMPLARY EMBODIMENTS

Figure 1:
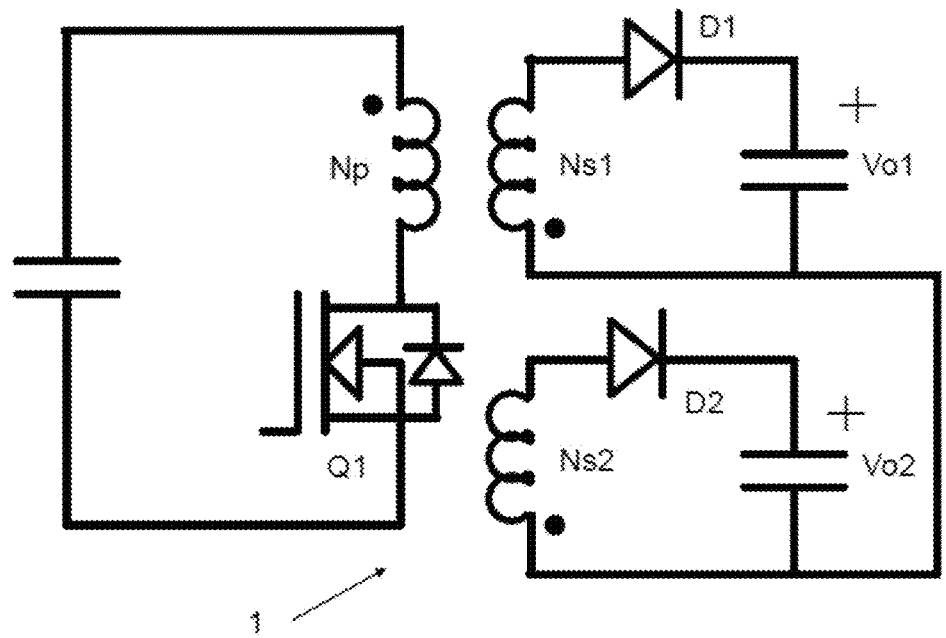
FIG. 1 is a circuit diagram of a conventional two-output flyback power supply device (circuit) 1 that has two output terminals.
Figure 2:
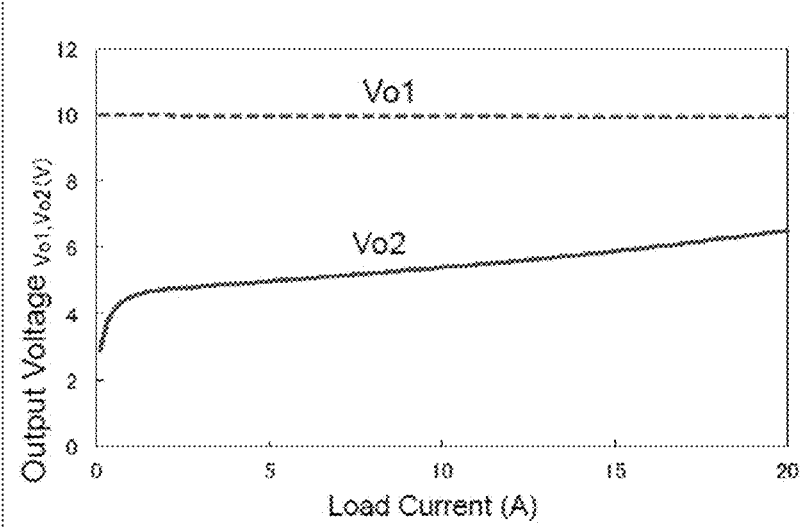
FIG. 2 is a graph that shows output voltages of first and second terminals Vo1 and Vo2 of the power supply device 1 shown in FIG. 1.

As discussed below, a power supply circuit according to an embodiment of the present invention is explained with reference to the drawings.

Redundant explanations with respect to the same components are omitted but the same reference numerals are used for labeling.

First Embodiment

Figure 3:
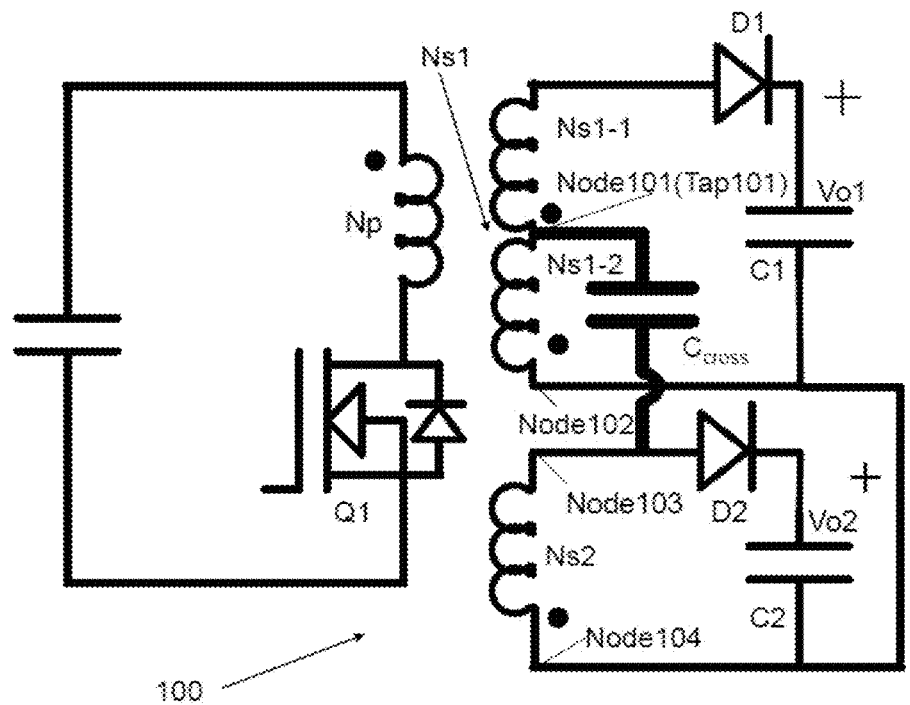
FIG. 3 is a circuit diagram that shows a power supply circuit 100 according to a first embodiment of the present invention.

FIG. 3 is a circuit diagram that shows a power supply circuit 100 according to a first embodiment of the present invention. Specifically, the conventional two-output flyback power supply device (circuit) 1 shown in FIG. 1 is improved by adding features according to the embodiment of the present invention so as to form the power supply circuit 100. The power supply circuit 100 shown in FIG. 3 is configured with a primary winding (coil) Np, a first output winding (a secondary winding) Ns1, a second output winding (a secondary winding) Ns2, a switching element Q1, a control circuit Ic (not shown), and rectifying devices (diodes) D1 and D2. Specifically, the first output winding (the secondary winding) Ns1 and the second output winding (the secondary winding) Ns2 are coupled to each other. The switching element Q1 is connected in series to the primary winding Np. The control circuit Ic controls the switching element Q1. The rectifying device (the diode) D1 supplies electric power to a first output terminal Vo1. Further, the rectifying device (the diode) D2 supplies electric power to a second output terminal Vo2. Because the winding directions of the primary winding Np and the secondary windings Ns1, Ns2 are opposite to each other, the power supply circuit 100 composes a flyback power supply circuit. Further, in the first output winding Ns1, a center tap Tap101 is provided at a part that has the same number of windings as the second output winding Ns2 (a node 101). Note that the term "a center tap" is not limited to a location of the tap as the center and is referred to as an intermediate tap as well in the specification. The center tap Tap101 and one terminal of the second output winding Ns2, which has the same polarity as the center tap Tap101, are connected to each other via a cross capacitor ($C_{cross}$). Further, other terminals (nodes 102 and 104) of the first and second output windings Ns1 and Ns2 are electrically and directly connected to each other.

Figure 4:
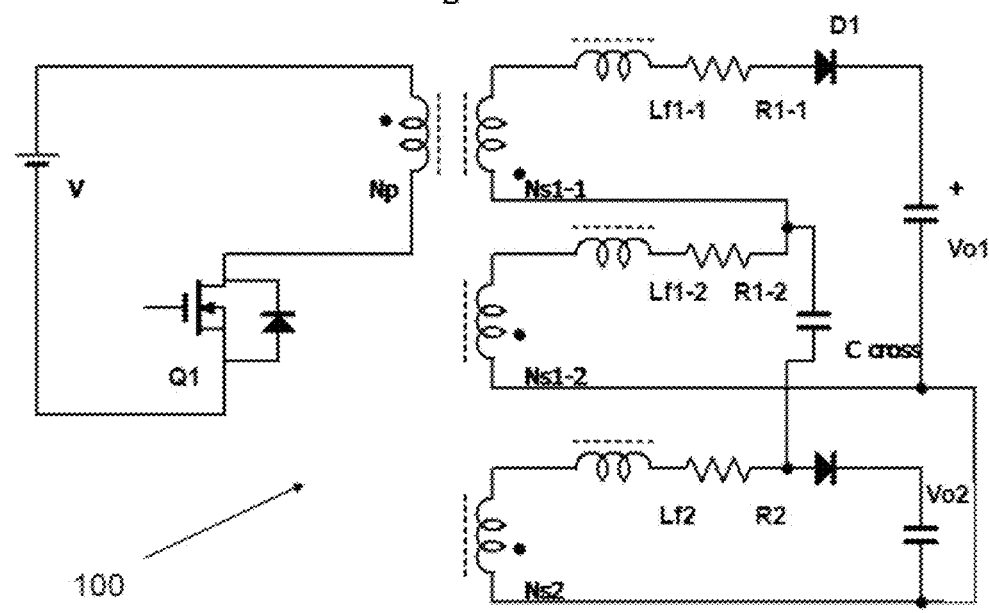
FIG. 4 is an equivalent circuit diagram when the power supply circuit 100 shown in FIG. 3 operates.

FIG. 4 is an equivalent circuit diagram when the power supply circuit 100 shown in FIG. 3 operates. Here, when a load is connected, a potential difference is generated between both terminals of the cross capacitors ($CC_{cross}$) because there is a difference of load currents. Therefore, a current flows from an output winding located at a side in which a voltage is high to an output winding located at a side in which a voltage is low via the cross capacitor in order to decrease a voltage of both terminals of the cross capacitor. When it is assumed that the voltage of the side of Ns1-2 is higher than the voltage of the side of the Ns2, in consideration of a set of a leakage inductance (Lf1-2) and a winding resistance (R1-2) of the output winding Ns1-2 and a set of a leakage inductance (Lf2) and a winding resistance (R2) of the output winding Ns2 in the equivalent circuit diagram (FIG. 4), the current of the cross capacitor $C_{cross}$ flows in along a path of $C_{cross} \rightarrow R1\text{-}2 \rightarrow Lf1\text{-}2 \rightarrow Ns1\text{-}2 \rightarrow Ns2 \rightarrow Lf2 \rightarrow R2 \rightarrow C_{cross}$. As a result, a difference between the output voltages becomes small.

Figure 5:
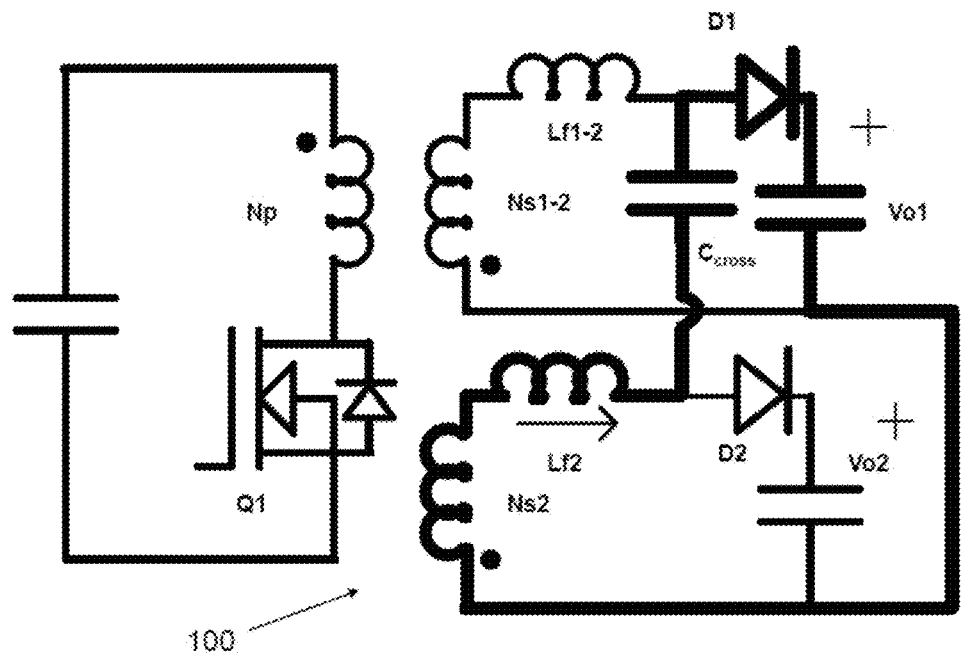
FIGS. 5 and 6 are circuit diagrams that show functions of a cross capacitor $C_{cross}$ in the power supply circuit 100 shown in FIG. 3.
Figure 6:
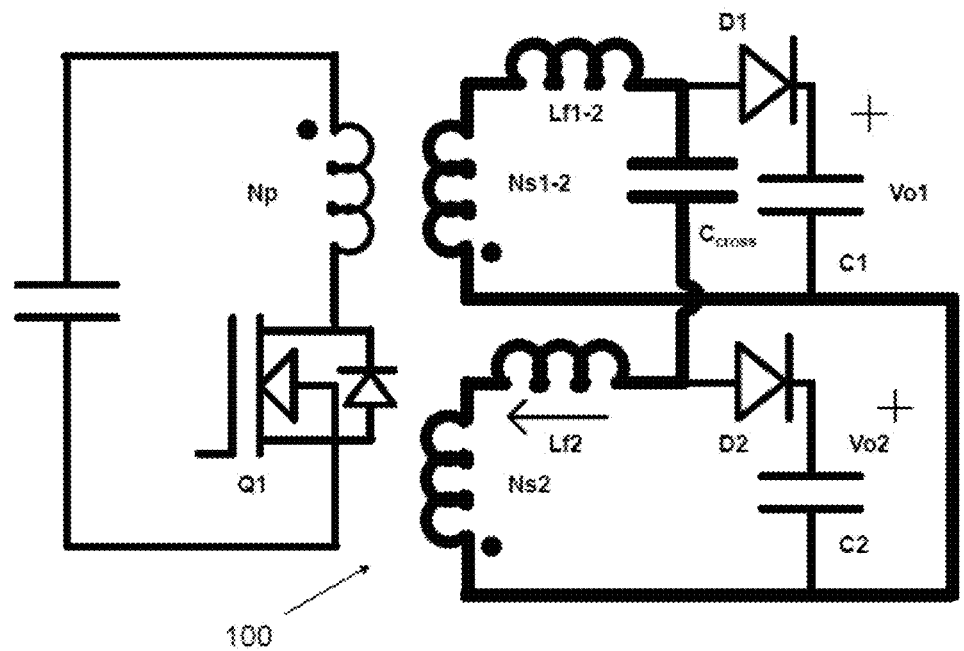

FIGS. 5 and 6 are circuit diagrams that show functions of the cross capacitor $C_{cross}$ in the power supply circuit 100 shown in FIG. 3. In order to make an explanation convenient here, the number of windings of the output winding Ns1-1 corresponds to 0. When a heavy load is applied to the first output terminal Vo1 and a light load is applied to the second output terminal Vo2, a voltage VLf1-2 (VLf1-2=L·d1/dt) between both terminals of the leakage inductance Lf1-2 becomes large because the leakage inductance Lf1-2 exists and a large current flows in the first output terminal Vo1. As a result, a voltage VNs1-2 (VNs1-2=VLf1-2+Vo1) between both terminals of the output winding Ns1-2 becomes large. Therefore, a voltage of the output winding Ns2 increases and energy is transferred to the second output terminal Vo2. However, because the cross capacitor $C_{cross}$ is added, in a first state shown in FIG. 5, the cross capacitor $C_{cross}$ provides a path and energy of the output winding Ns2 is transferred to the first output terminal Vo1 instead of the second output terminal Vo2. In a second state shown in FIG. 6, after the energy is transferred, the potential difference generated between both terminals of the cross capacitor $C_{cross}$ is automatically kept balanced by the output windings Ns1-2 and Ns2. According to a voltage (energy) balance effect of the cross capacitor $C_{cross}$, the cross-regulation can be improved.

When the light load is applied to the first output terminal Vo1 and the heavy load is applied to the second output terminal Vo2, the cross capacitor $C_{cross}$ transfers extra energy of the output winding Ns1-2 to the second output terminal Vo2 in the same manner as discussed above. Therefore, the cross-regulation can be significantly improved.

Figure 7:
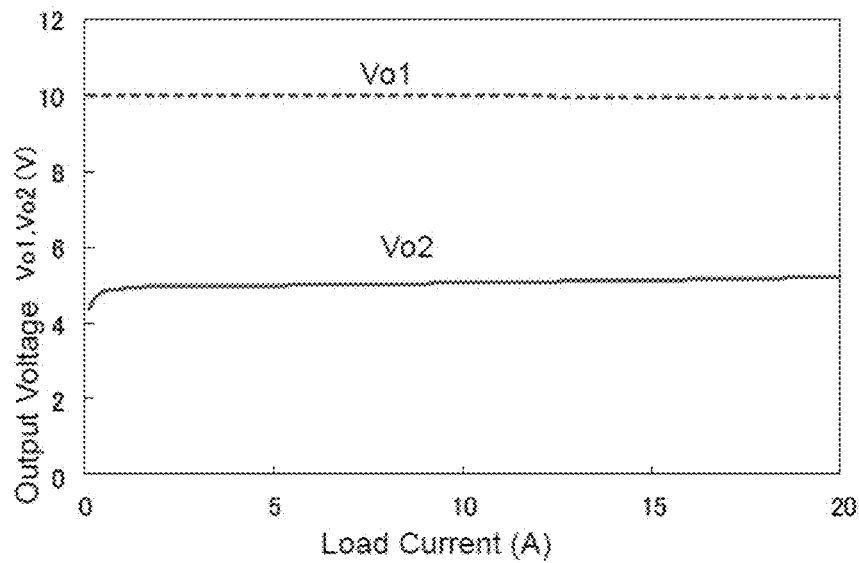
FIG. 7 is a graph that shows output voltages of first and second terminals Vo1 and Vo2 of the power supply circuit 100 shown in FIG. 3.

FIG. 7 is a graph that shows output voltages of the first and second terminals Vo1 and Vo2 of the power supply circuit 100 shown in FIG. 3. In the power supply circuit 100 shown in FIG. 3, an output voltage value of the first output terminal Vo1 corresponds to 10V (with the feedback control) and a load of the first output terminal Vo1 corresponds to 0.1 A-20 A. An output voltage value of the second output terminal Vo2 corresponds to 5V (without the feedback control) and a load of the second output terminal Vo2 corresponds to 5 A (fixed). At this time, the output voltage variations are shown in FIG. 7. As shown in FIG. 7, the output voltage of the second output terminal Vo2 is very stable and is substantially fixed to 5V. As a result, FIG. 7 clearly shows that the cross-regulation of the power supply circuit 100 can significantly be improved.

In the first embodiment of the present invention, one of the output terminals is feedback-controlled and another output terminal is not feedback-controlled. However, both output terminals may be feedback-controlled by using a value that is obtained by adding each of two output voltages with a predetermined rate. For example, they are feedback-controlled so as to make a sum of 80% of the output voltage of the first output terminal Vo1 and 20% of the output voltage of the second output terminal Vo2 a predetermined value. In the power supply circuit explained above, the cross-regulation can be improved in the same manner as explained above by the voltage (energy) balance effect of the cross capacitor $C_{cross}$.

In the first embodiment of the present invention, the other terminals (the nodes 102 and 104) of the first and second output windings Ns1 and Ns2 are electrically and directly connected to each other by a wire as explained above. However, the nodes 102 and 104 may also be connected via, for example, a capacitor, constant voltage supply, or a Zener diode. That is, it forms a closed loop by connecting between the output winding Ns1-2 and the output winding Ns2 via the cross capacitor $C_{cross}$. The reason why the capacitor, the constant voltage supply, or the Zener diode is used is to provide a relatively stable voltage between the nodes 102 and 104.

In the first embodiment of the present invention, the number or windings of the output winding Ns1-1 may also correspond to 0. In this case, the power supply circuit 100 has two same outputs or two opposite outputs.

In the first embodiment of the present invention, the center tap 101 is provided at the first output winding Ns1. However, instead of providing the center tap 101 at the first output winding Ns1, an additional output winding may be added to the second output winding Ns2 to adjust the number of windings between the first and second output windings Ns1 and Ns2. Thus, the second output winding Ns2 is connected to the cross capacitor $C_{cross}$ via the additional output winding. Because the additional output winding is added to the second output winding Ns2 as explained above, a total number of windings of the additional and second output windings Ns2 is the same as a total number of windings of the first output winding Ns1 (a sum of Ns1-1 and Ns1-2). Thereby, the above alternative embodiment can have the same effect as the first embodiment, i.e., the cross-regulation is improved.

Second Embodiment

Figure 8A:
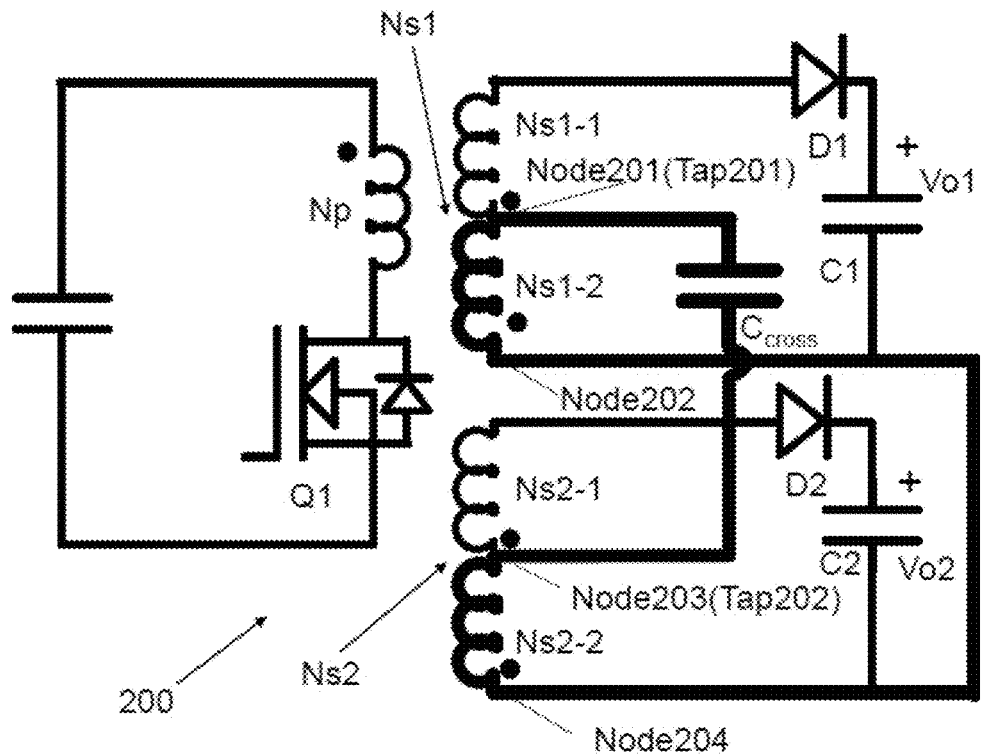
FIG. 8A is a circuit diagram that shows a power supply circuit 200 according to a second embodiment of the present invention.

FIG. 8A is a circuit diagram that shows a power supply circuit 200 according to a second embodiment of the present invention. In the power supply circuit 200, center taps are provided at both of a first output winding (the secondary winding) Ns1 and a second output winding (the secondary winding) Ns2. In this respect, the power supply circuit 200 according to the second embodiment of the present invention is mainly different from the power supply circuit 100 according to the first embodiment of the present invention.

The power supply circuit 200 is configured with a primary winding Np, the first output winding (the secondary winding) Ns1, the second output winding (the secondary winding) Ns2, a switching element Q1, a control circuit Ic (not shown), and rectifying devices (diodes) D1 and D2. Specifically, the first output winding (the secondary winding) Ns1 and the second output winding (the secondary winding) Ns2 are coupled to each other. The switching element Q1 is connected in series to the primary winding Np. The control circuit Ic controls the switching element Q1. The rectifying device (the diode) D1 supplies electric power to a first output terminal Vo1. Further, the rectifying device (the diode) D2 supplies electric power to a second output terminal Vo2. Because the winding directions between the primary winding Np and the secondary output windings Ns1 and Ns2 are opposite, the power supply circuit 200 composes a flyback power supply circuit. Further, in the first output winding Ns1 and the second output winding Ns2, center taps Tap201 and Tap202 are respectively provided at positions that have the same number of windings (nodes 201 and 203). At the same time, the center taps Tap201 and Tap202 are connected to each other via a cross capacitor $C_{cross}$. Further, other terminals (nodes 202 and 204) are electrically connected.

An operation principle of the power supply circuit 200 is the same as the power supply circuit 100. An output winding Ns1-2 and an output winding Ns2-2 are connected to the cross capacitor $C_{cross}$. The cross-regulation can be improved by the energy (voltage) balance effect of the cross capacitor $C_{cross}$.

Further, in the second embodiment of the present invention, one of the output terminals is feedback-controlled and another output terminal is not feedback-controlled. However, both output terminals may be feedback-controlled by using a value that is obtained by adding each of two output voltages with a predetermined rate. In the power supply circuit 200 explained above, the cross-regulation can be improved by the energy (voltage) balance effect of the cross capacitor $C_{cross}$ in the same manner as the previous embodiment.

In the second embodiment of the present invention, the power supply circuit 200 that has two positive (+) output terminals is configured by electrically and directly connecting the other terminals (the nodes 202 and 204) explained above. However, the nodes 202 and 204 may also be connected via, for example, a capacitor, constant voltage supply, or a Zener diode. That is, it forms a closed loop by connecting between the output winding Ns1-2 and the output winding Ns2-2 via the cross capacitor $C_{cross}$.

Figure 8B:
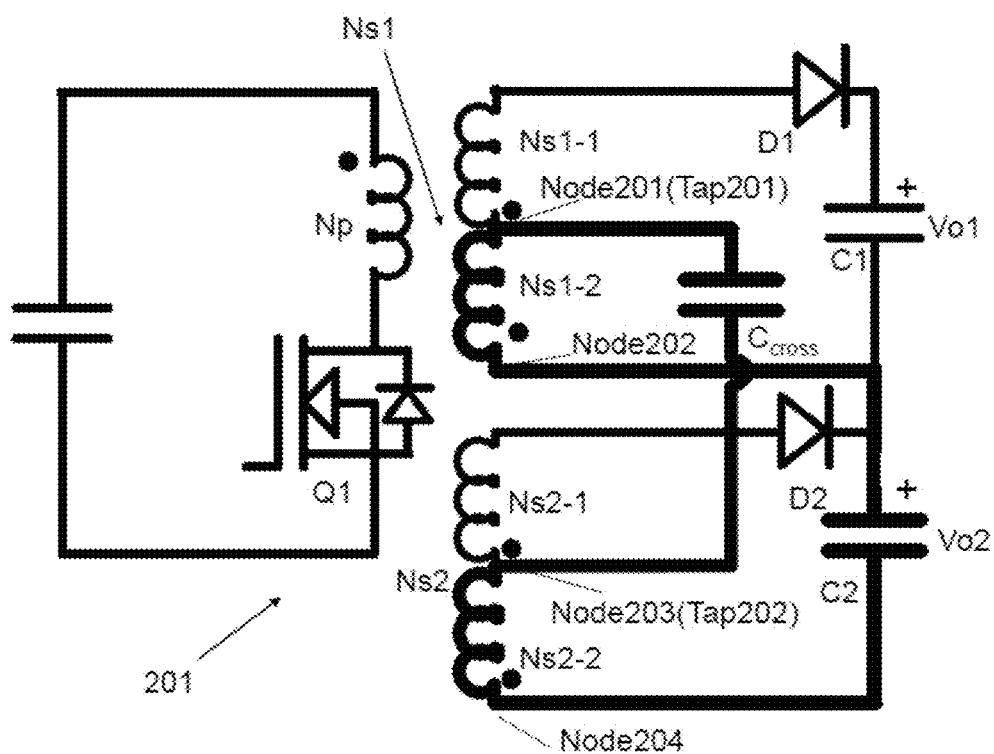
FIG. 8B is a circuit diagram that shows a power supply circuit 201 related to a variation of the second embodiment of the present invention.

For Instance, FIG. 8B is a circuit diagram that shows a power supply circuit 201 related to a variation of the second embodiment of the present invention. The power supply circuit 201 that has one positive (+) output terminal and one negative (−) output terminal is configured by connecting the other terminals (the nodes 202 and 204) via the capacitor C2. At the same time, a closed loop is formed by connecting between the output winding Ns1-2 and the output winding Ns2-2 that have the same number of windings via the capacitors C2 and the cross capacitor $C_{cross}$. As a result, the voltage difference between the two output terminals can be decreased and the cross-regulation can be improved.

Figure 8C:
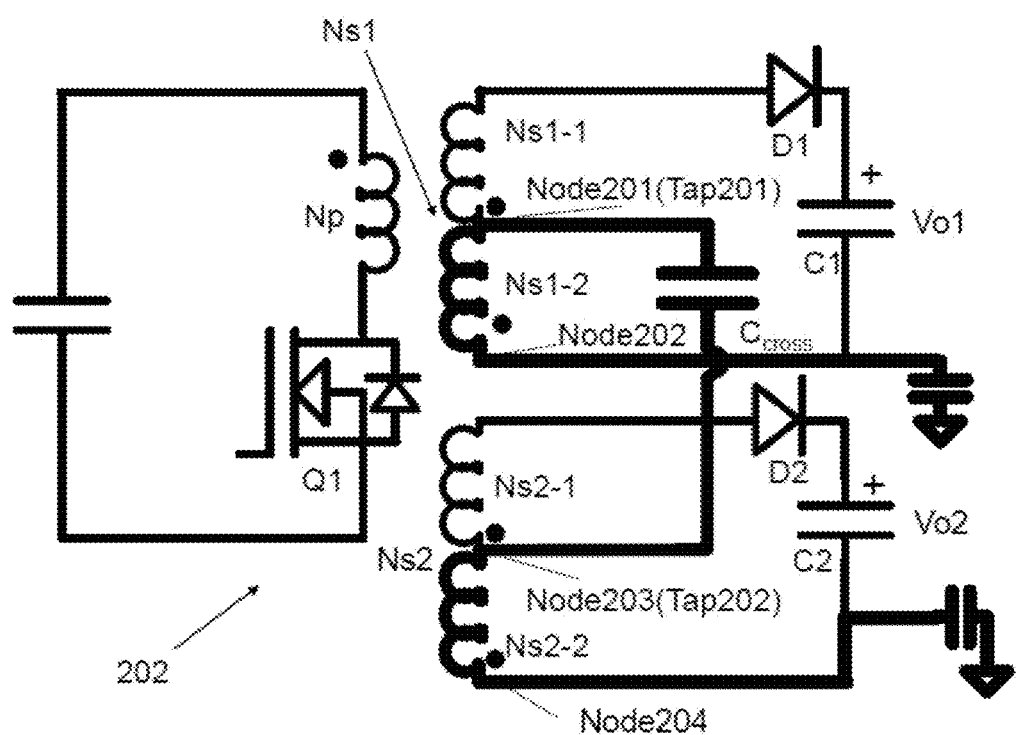
FIG. 8C is a circuit diagram that shows a power supply circuit 202 related to a variation of the second embodiment of the present invention.

For instance, FIG. 8C is a circuit diagram that shows a power supply circuit 202 related to a variation of the second embodiment of the present invention. The other terminals (the nodes 202 and 204) are respectively connected to a ground potential of an AC power source so as to configure the power supply circuit 202 that has two isolated output terminals. At the same time, a closed loop is formed by connecting between the output windings Ns1-2 and Ns2-2 that have the same number of windings via the ground GND and the cross capacitor $C_{cross}$. As a result, the voltage difference between the two output terminals can be decreased and the cross-regulation can be improved.

Further, in the second embodiment and the variations of the second embodiment, the number of windings of the output windings Ns1-1 and Ns2-1 may correspond to 0. When the number of windings of either of the output winding Ns1-1 and the output winding Ns2-1 corresponds to 0, the second embodiment and the variations of the second embodiment are the same as the first embodiment. When the number of windings of both of the output windings Ns1-1 and Ns2-1 corresponds to 0, the power supply circuit 200 has two same outputs or two opposite outputs.

Further, the positions of the first output winding Ns1 and the second output winding Ns2 can be reversed in the second embodiment of the present invention.

Third Embodiment

Figure 9:
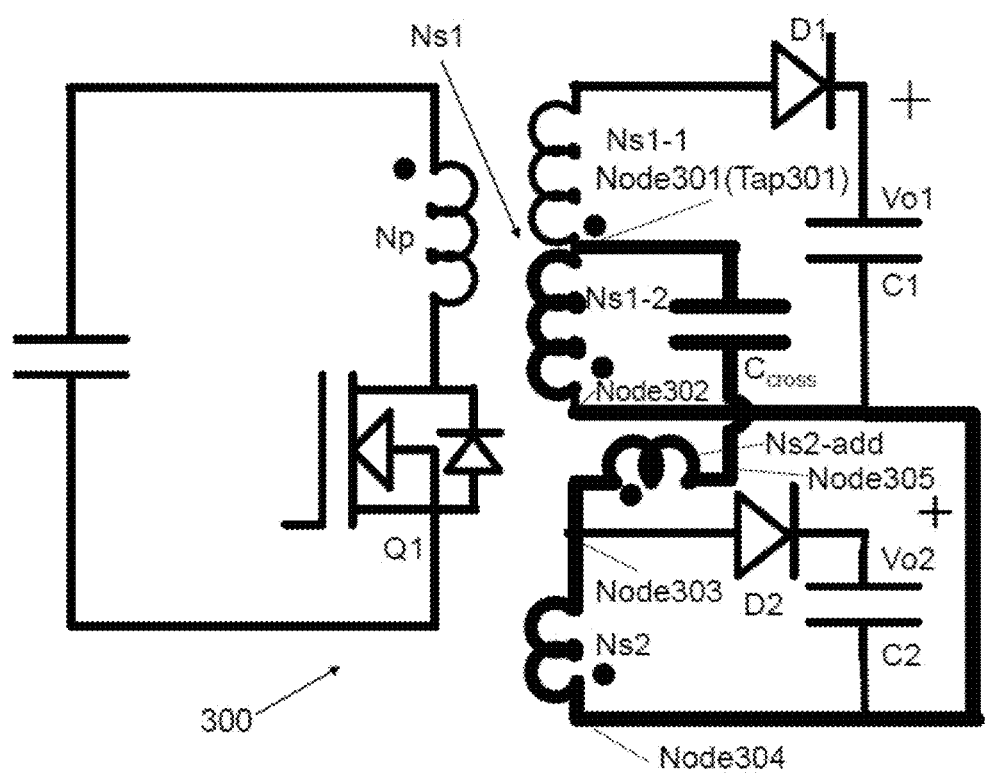
FIG. 9 is a circuit diagram that shows a power supply circuit 300 according to a third embodiment of the present invention.

FIG. 9 is a circuit diagram that shows a power supply circuit 300 according to a third embodiment of the present invention. In the power supply circuit 300, an additional output winding is added to the second output winding (the secondary winding) Ns2. As a result, the first output winding (the secondary winding) Ns1 and the second output winding Ns2 are connected via the additional output winding. In this respect, the power supply circuit 300 according to the third embodiment of the present invention is mainly different from the power supply circuit 200 according to the second embodiment of the present invention.

The power supply circuit 300 is configured with a primary winding Np, a first output winding (the secondary winding) Ns1, a second output winding (the secondary winding) Ns2, a switching element Q1, a control circuit Ic (not shown), and rectifying devices (diodes) D1 and D2. Specifically, the first output winding (the secondary winding) Ns1 and the second output winding (the secondary winding) Ns2 are coupled to each other. The switching element Q1 is connected in series to the primary winding Np. The control circuit Ic controls the switching element Q1. The rectifying device (the diode) D1 supplies electric power to the first output terminal Vo1. Further, the rectifying device (the diode) D2 supplies electric power to the second output terminal Vo2. Because the winding directions among the primary winding Np and the secondary output windings Ns1 and Ns2 are opposite, the power supply circuit 300 composes the flyback power supply circuit. Further, a center tap Tap301 (a node 301) is provided at the first output winding Ns1 and an additional output winding Ns2-add (a node 303) is added to the second output winding Ns2. As a result, the number of windings of the output winding Ns1-2 is equal to a total number of windings of the output winding Ns2 and the additional output winding Ns2-add. At the same time, the center tap Tap301 of the first output winding Ns1 (the node 301) and one terminal (the node 305), which is the same polarity as the center tap Tap301, of the additional output winding Ns2-add of the second output winding Ns2 (the node 303) are connected to each other via the cross capacitor $C_{cross}$. Further, other terminals (nodes 302 and 304) are electrically connected.

An operation principle of the power supply circuit 300 is the same as the power supply device 100. The output winding Ns1-2 and the output winding (Ns2+Ns2-add) are connected to the cross capacitor $C_{cross}$. The cross-regulation can be improved by the energy (voltage) balance effect of the cross capacitor $C_{cross}$.

Further, in the third embodiment of the present invention, one of the output terminals is feedback-controlled and another output terminal is not feedback-controlled. However, both output terminals may be feedback-controlled by using a value that is obtained by adding each of two output voltages with a predetermined rate. In the power supply circuit 300 explained above, the cross-regulation can be improved by the energy (voltage) balance effect of the cross capacitor $C_{cross}$ in the same manner as the previous embodiment.

In the third embodiment of the present invention, the other terminals (the nodes 302 and 304) explained above are directly connected by the wire. However, the nodes 302 and 304 may also be connected via, for example, a capacitor, constant voltage supply, or a Zener diode. That is, it forms a closed loop by connecting between the output winding Ns1-2 and the output winding (Ns2-add+Ns2) via the cross capacitor $C_{cross}$.

In the third embodiment of the present invention, an additional output winding N1-add may be added to the first output winding Ns1. As a result, the number of windings of the output winding (Ns1-add+Ns1) and the number of windings of the output winding (Ns2-add+Ns2) are equal. According to the configuration explained above, an effect of the improvement of the cross-regulation can be obtained in the same manner as explained above. Further, because a center tap or an additional output winding is provided at both or either of the first output winding Ns1 and the second output winding Ns2, the total number of the windings of two output terminals can be equal in a circuit that includes the cross capacitor $C_{cross}$, the first output winding Ns1 and the second output winding Ns2 (a part with bold lines in FIG. 9).

Further, the positions of the first output winding Ns1 and the second output winding Ns2 can also be reversed in the third embodiment of the present invention.

Fourth Embodiment

Figure 10:
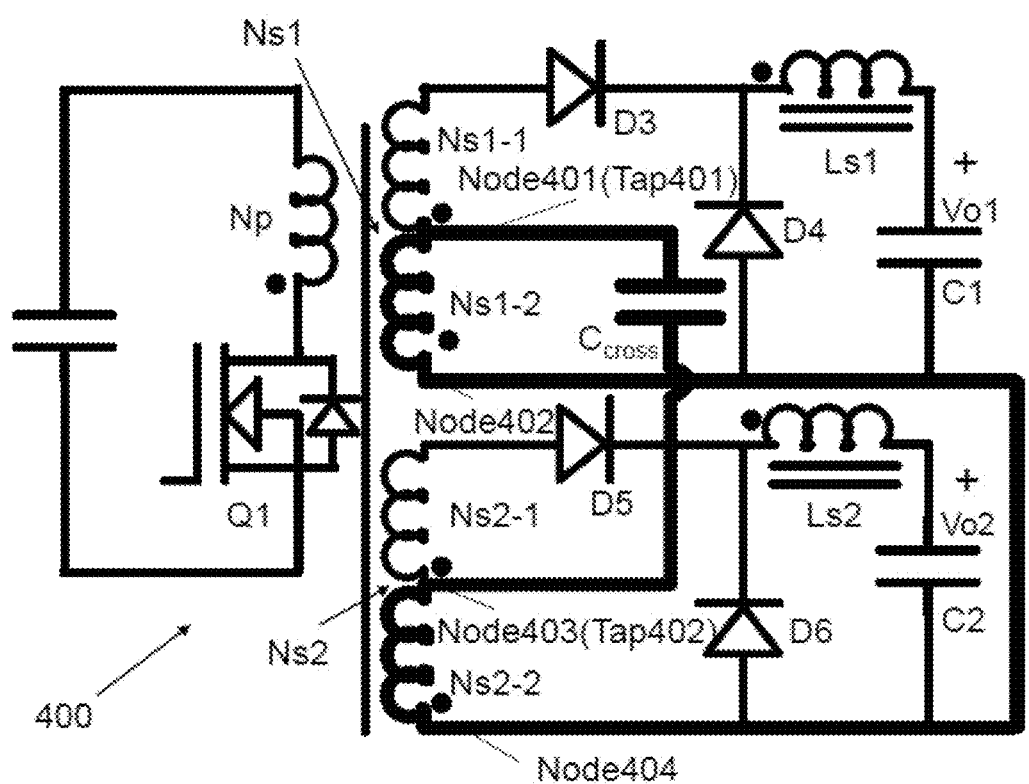
FIG. 10 is a circuit diagram that shows a power supply circuit 400 according to a fourth embodiment of the present invention.

FIG. 10 is a circuit diagram that shows a power supply circuit 400 according to a fourth embodiment of the present invention. The power supply circuit 400 corresponds to a forward power supply circuit. In this respect, the power supply circuit 400 according to the fourth embodiment of the present invention is mainly different from the power supply circuit 200 according to the second embodiment of the present invention.

The power supply circuit 400 shown in FIG. 10 is different from the power supply circuit 200 according to the second embodiment of the present invention with respect to a configuration of a secondary winding. Winding directions of secondary output windings Ns1 and Ns2 are reversed with respect to winding directions of the secondary windings of the power supply circuit 200 according to the second embodiment. The winding directions of the primary winding Np and the secondary output windings Ns1, Ns2 are the same. Thus, it configures the forward power supply circuit. The side of the first output winding Ns1 contains rectifying devices D3 and D4, an inductor Ls1 and a capacitor C1. The side of the second output winding Ns2 contains rectifying devices D5 and D6, an inductor Ls2 and a capacitor C2. Further, two center taps Tap401 and Tap402 (nodes 401 and 403) are respectively provided at positions, which have the same number of windings, of the first output winding Ns1 and the second output winding Ns2. At the same time, the center taps Tap401 and Tap402 (the nodes 401 and 403) are connected to each other via the cross capacitor $C_{cross}$. Further, other terminals (nodes 402 and 404) are electrically connected.

An operation principle of the power supply circuit 400 is the same as the power supply circuit 200. An output winding Ns1-2 and an output winding Ns2-2 are connected to the cross capacitor $C_{cross}$. The cross-regulation can be improved by the energy (voltage) balance effect of the cross capacitor $C_{cross}$.

In the fourth embodiment of the present invention, one of the output terminals is feedback-controlled and another output terminal is not feedback-controlled. However, both output terminals may be feedback-controlled by using a value that is obtained by adding each of two output voltages with a predetermined rate. In the power supply circuit 400 explained above, the cross-regulation can be improved by the energy (voltage) balance effect of the cross capacitor $C_{cross}$ in the same manner as the previous embodiment.

In the fourth embodiment of the present invention, the other terminals (the nodes 402 and 404) explained above are directly connected by the wire. However, the node 402 and 404 may also be connected via, for example, a capacitor, constant voltage supply, or a Zener diode. That is, it forms a closed loop by connecting between the output winding Ns1-2 and the output winding Ns2-2 via the cross capacitor $C_{cross}$.

The power supply circuit 400 according to the fourth embodiment is configured by directly connecting the other terminals (the nodes 402 and 404) explained above by the wire with two positive (+) output terminals in the same manner as the power supply circuit 200 according to the second embodiment of the present invention. However, as discussed in the variations according to the second embodiment, a power supply circuit that has one positive (+) output terminal and one negative (−) output terminal is configured by connecting the other terminals (the nodes 402 and 404) via the capacitor. Alternatively, the other terminals (the nodes 402 and 404) are respectively connected to a ground potential of an AC power source and configure a power supply circuit that has two isolated output terminals. As a result, the same effect according to the variations of the second embodiment can be obtained.

Further, in the fourth embodiment and the variations of the fourth embodiment of the present invention, both of the number of windings of the output windings Ns1-1 and Ns2-1 may also correspond to 0. When both of the number of windings of the output windings Ns1-1 and Ns2-1 correspond to 0, the power supply circuit 400 has two same outputs or two opposite outputs.

Further, the positions of the first output winding Ns1 and the second output winding Ns2 can also be reversed in the fourth embodiment of the present invention.

Further, the output winding Ns2 according to the fourth embodiment is connected to the cross capacitor $C_{cross}$ via an additional output winding, which is added to the output winding Ns2, in the same manner as the third embodiment of the present invention.

Fifth Embodiment

Figure 11:
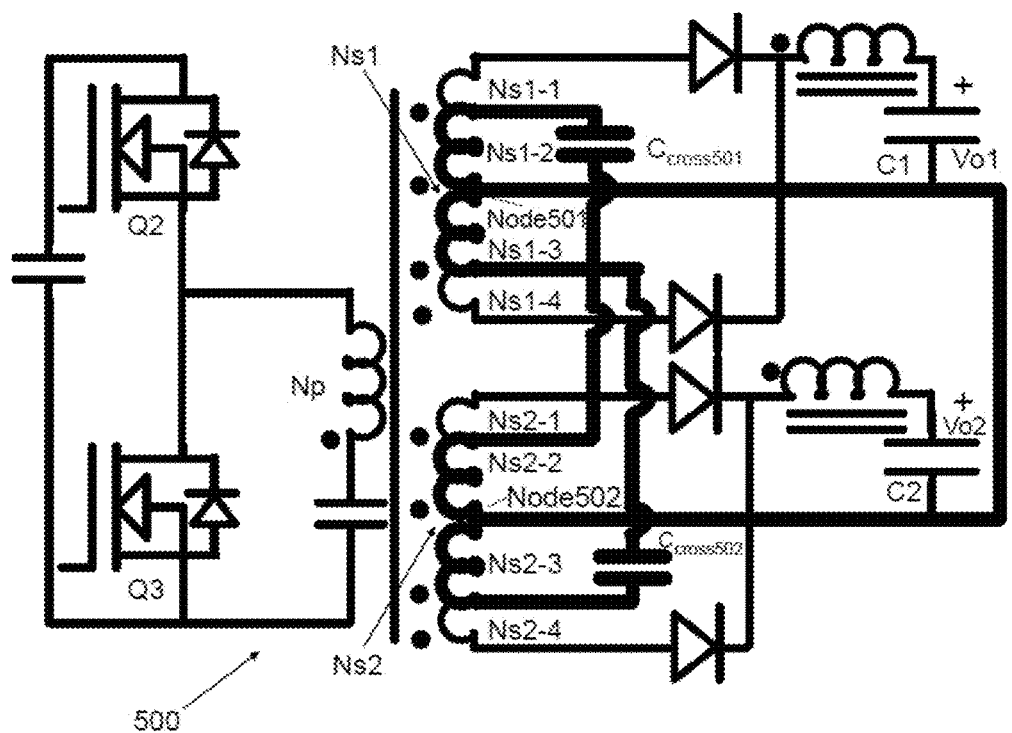
FIG. 11 is a circuit diagram that shows a power supply circuit 500 according to a fifth embodiment of the present invention.

FIG. 11 is a circuit diagram that shows a power supply circuit 500 according to a fifth embodiment of the present invention. The power supply circuit 500 according to the fifth embodiment corresponds to a half bridge type power supply circuit. In this respect, the power supply circuit 500 according to the fifth embodiment of the present invention is mainly different from the power supply circuit 200 according to the second embodiment of the present invention.

The power supply circuit 500 is configured with a primary winding Np, a first output winding (a secondary winding) Ns1, a second output winding (a secondary winding) Ns2 and switching elements Q2, Q3. Specifically, the first output winding (the secondary winding) Ns1 and the second output winding (the secondary winding) Ns2 are coupled to each other. The switching elements Q2 and Q3 are connected to the primary winding Np. The first output winding Ns1 is divided into output windings Ns1-1, Ns1-2, Ns1-3 and Ns1-4. Further, the second output winding Ns2 is divided into the output windings Ns2-1, Ns2-2, Ns2-3 and Ns2-4.

Specifically, the number of windings of the output windings Ns1-2 and Ns2-2 are the same. The number of windings of the output windings Ns1-3 and Ns2-3 are also the same. The output windings Ns1-2 and Ns2-2 are connected via a first cross capacitor $C_{cross501}$. The output windings Ns1-3 and Ns2-3 are connected via a second cross capacitor $C_{cross502}$. Further, the number of windings of the output windings Ns1-1 and Ns1-4 or the output windings Ns2-1 and Ns2-4 can also correspond to 0. In this case, there is no center tap.

An operation principle of the power supply circuit 500 is the same as the power supply circuit 200. The output windings Ns1-2 and Ns2-2 are connected to the cross capacitor $C_{cross501}$. The cross-regulation can be improved by the energy (voltage) balance effect of the cross capacitor $C_{cross501}$. Further, the output winding Ns1-3 and Ns2-3 are connected to the cross capacitor $C_{cross502}$. The cross-regulation can be improved by the energy (voltage) balance effect of the cross capacitor $C_{cross502}$.

In the fifth embodiment of the present invention, the other terminals (nodes 501 and 502) are directly connected to each other by the wire. However, the nodes 501 and 502 may also be connected via, for example, a capacitor, constant voltage supply, or a Zener diode. That is, it forms a closed loop by connecting between the output winding Ns1-2 and the output winding Ns2-2 and between the output winding Ns1-3 and the output winding Ns2-3 via the cross capacitors $C_{cross501}$ and $C_{cross502}$, respectively.

Sixth Embodiment

Figure 12:
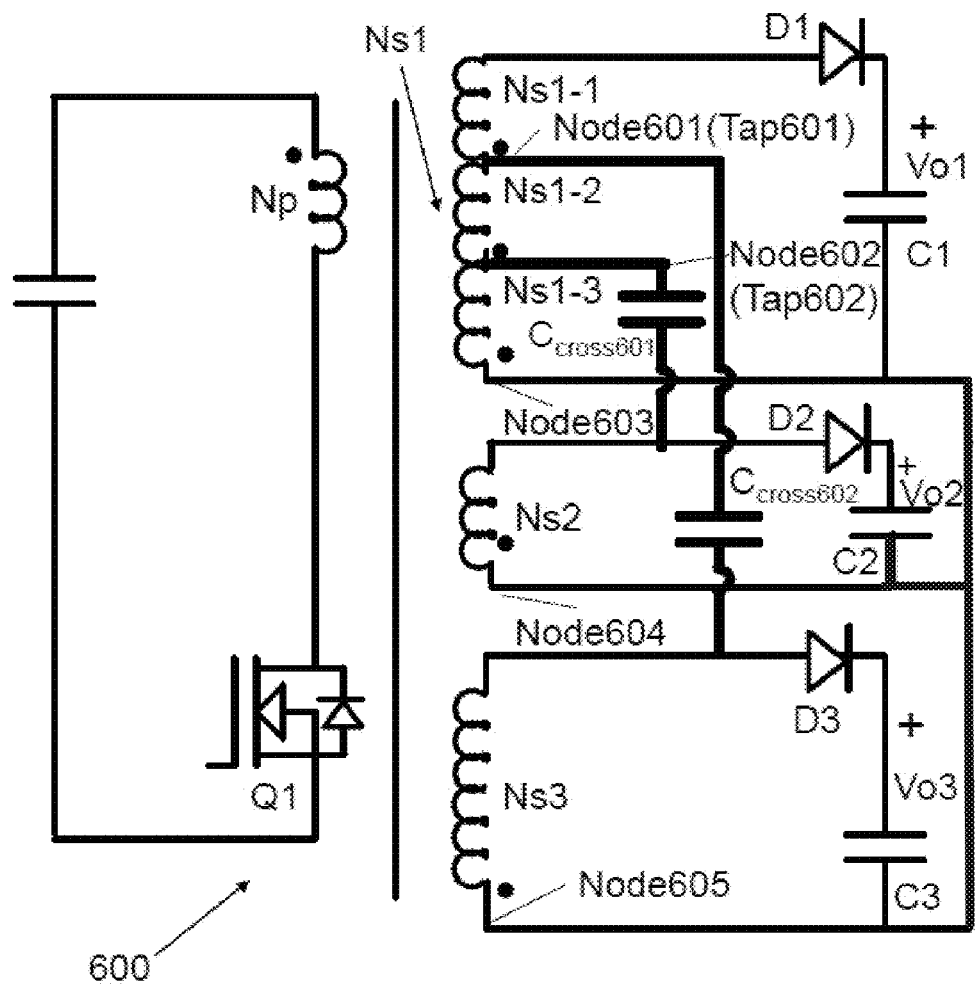
FIG. 12 is a circuit diagram that shows a power supply circuit 600 according to a sixth embodiment of the present invention.

FIG. 12 is a circuit diagram that shows a power supply circuit 600 according to a sixth embodiment of the present invention. The power supply circuit 600 according to the sixth embodiment has three output terminals. In this respect, the power supply circuit 600 according to the sixth embodiment of the present invention is mainly different from the power supply circuit 200 according to the second embodiment of the present invention.

The power supply circuit 600 is configured with a primary winding Np, a first output winding (a secondary winding) Ns1, a second output winding (a secondary winding) Ns2, a third output winding (a secondary winding) Ns3, a switching element Q1, a control circuit Ic (not shown), and rectifying devices (diodes) D1, D2 and D3. Specifically, the first output winding (the secondary winding) Ns1, the second output winding (the secondary winding) Ns2 and the third output winding (the third winding) Ns3 are coupled to one another. The switching element Q1 is connected in series to the primary winding Np. The control circuit Ic controls the switching element Q1. The rectifying device (the diode) D1 supplies electric power to a first output terminal Vo1. The rectifying device (the diode) D2 supplies electric power to a second output terminal Vo2. Further, the rectifying device (the diode) D3 supplies electric power to a third output terminal Vo3. Because the winding directions among the primary winding Np and the secondary output windings Ns1, Ns2 and Ns3 are opposite, the power supply circuit 600 composes the flyback power supply circuit. Further, in the first output winding Ns1, a center tap Tap602 (a node 602) is provided at a position that has the same numbers of windings and the same polarity as the second output winding Ns2. In addition, in the first output winding Ns1, a center tap Tap601 (a node 601) is provided at a position that has the same numbers of windings and the same polarity as the third output winding Ns3. At the same time, the center tap Tap602 and the second output winding Ns2 are connected via a cross capacitor $C_{cross601}$. The center tap Tap601 and the third output winding Ns3 are also connected via a cross capacitor $C_{cross602}$.

Figure 13:
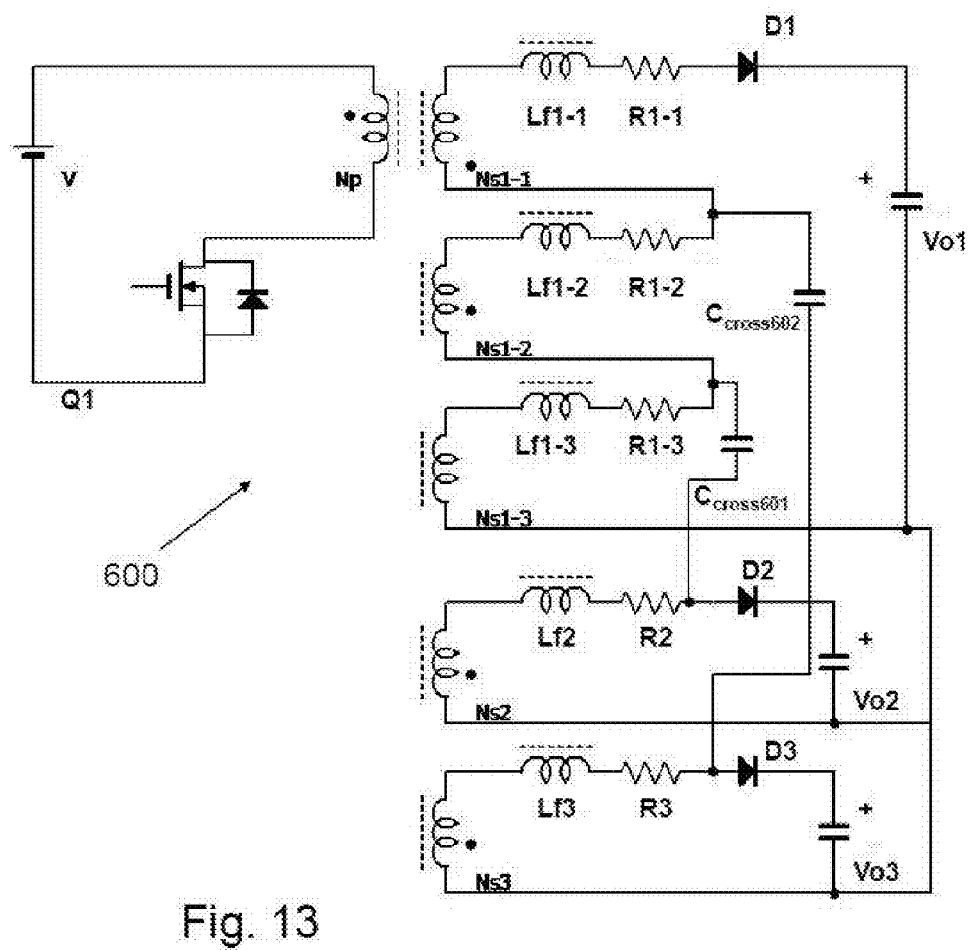
FIG. 13 is an equivalent circuit diagram when the power supply circuit 600 shown in FIG. 12 operates.

FIG. 13 is an equivalent circuit diagram when the power supply circuit 600 shown in FIG. 12 operates. A current flows from an output winding in which a voltage of an output circuit is high toward an output winding in which a voltage of an output circuit is low via the cross capacitor. Thus, the current flows along a path of $C_{cross601}$→R1-3→Lf1-3→Ns1-3→Ns2→Lf2→R2 in order to make the voltage of both terminals of the cross capacitor $C_{cross601}$ decrease. As a result, a difference between the output voltages becomes small. Similarly, the current flows along a path of $C_{cross602}$→R1-2→Lf1-2→Ns1-2→R1-3→Lf1-3→Ns1-3→Ns3→Lf3→R3 in order to make the voltages of the both terminals of the cross capacitor $C_{cross602}$ decrease.

An operation principle of the power supply circuit 600 is the same as the power supply circuit 200. The output windings Ns1-3 and the output winding Ns2 are connected to the cross capacitor $C_{cross601}$. Because energy can be absorbed and returned (the energy balance effect) by the cross capacitor $C_{cross601}$, the cross-regulation can be improved. Further, the output winding (Ns1-2+Ns1-3) and the output winding Ns3 are connected to the cross capacitor $C_{cross602}$. The cross-regulation can be improved by the energy (voltage) balance effect of the cross capacitor $C_{cross602}$.

In the sixth embodiment of the present invention, one of the output terminals is feedback-controlled and the other two output terminals are not feedback-controlled. However, on the contrary, two output terminals may be feedback-controlled by using a value that is obtained by adding each of two output voltages with a predetermined rate and another output terminal may not be feedback-controlled. Alternatively, all of three output terminals may be feedback-controlled by using the predetermined rate. In the power supply circuit 600 explained above, the cross-regulation can be improved by the energy (voltage) balance effect of the cross capacitors $C_{cross601}$ and $C_{cross602}$ in the same manner as the previous embodiment.

In the sixth embodiment of the present invention, the node 601 and the third output winding Ns3, which have the same polarity, are connected to each other via the cross capacitor $C_{cross602}$. Similarly, the node 602 and the second output winding Ns2, which have the same polarity, are connected to each other via the cross capacitor $C_{cross601}$. The nodes 603 and 605 are directly connected by a wire. Similarly, the nodes 603 and 604 are directly connected by the wire. However, the nodes 603 and 604 may be connected via, for example, a capacitor, constant voltage supply, or a Zener diode. Further, the nodes 603 and 605 may also be connected via, for example, a capacitor, constant voltage supply, or a Zener diode. That is, it forms a closed loop by appropriately connecting among the output windings (Ns1-1, Ns1-2, Ns1-3, Ns2 and Ms3) via the cross capacitors $C_{cross601}$ and $C_{cross602}$.

Further, in the sixth embodiment of the present invention, the number of windings of the output winding Ns1-1 may correspond to 0. This situation explained above is applied to a state in which a first output voltage and a second output voltage are equal (for instance, both correspond to 12V or ±12V).

Seventh Embodiment

Figure 14:
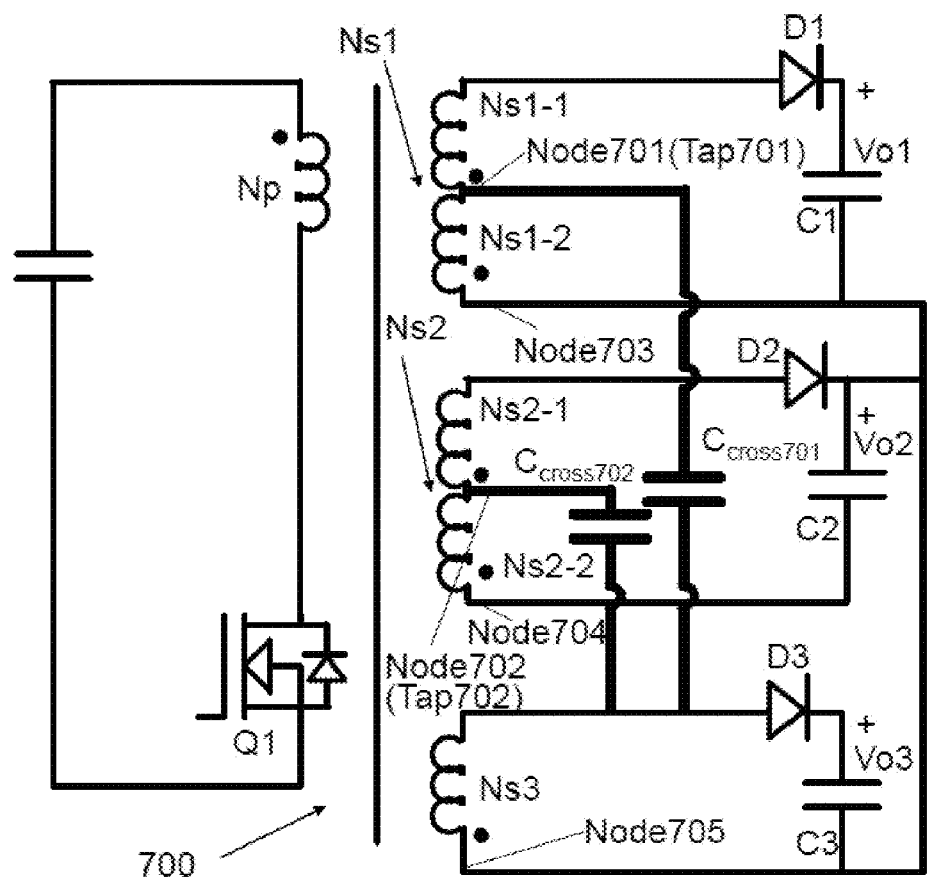
FIG. 14 is a circuit diagram that shows a power supply circuit 700 according to a seventh embodiment of the present invention.

FIG. 14 is a circuit diagram that shows a power supply circuit 700 according to a seventh embodiment of the present invention. In the power supply circuit 700 according to the seventh embodiment, a location of a center tap is different from the power supply circuit 600. In this respect, the power supply circuit 700 is mainly different from the power supply circuit 600 according to the sixth embodiment of the present invention.

The power supply circuit 700 is configured with a primary winding Np, a first output winding (a secondary winding) Ns1, a second output winding (a secondary winding) Ns2, a third output winding (a secondary winding) Ns3, a switching element Q1, a control circuit Ic (not shown), and rectifying devices (diodes) D1, D2 and D3. Specifically, the first output winding (the secondary winding) Ns1, the second output winding (the secondary winding) Ns2 and the third output winding (the secondary winding) Ns3 are coupled to one another. The switching element Q1 is connected in series to the primary winding Np. The control circuit Ic controls the switching element Q1. The rectifying device (the diode) D1 supplies electric power to a first output terminal Vo1. The rectifying device (the diode) D2 supplies electric power to a second output terminal Vo2. Further, the rectifying device (the diode) D3 supplies electric power to a third output terminal Vo3. Because the winding directions among the primary winding Np and the secondary output windings Ns1, Ns2 and Ns3 are opposite, the power supply circuit 700 composes the flyback power supply circuit. Further, in the first output winding Ns1, a center tap Tap701 is provided at a position that has the same numbers of windings and the same polarity as the third output winding Ns3. In the second output winding Ns2, a center tap Tap702 is provided at a position that has the same numbers of windings and the same polarity as the third output winding Ns3. At the same time, the center tap Tap701 and the third output winding Ns3 are connected via a cross capacitor $C_{cross701}$. The center tap Tap702 and the third output winding Ns3 are also connected via a cross capacitor $C_{cross702}$.

An operation principle of the power supply circuit 700 is the same as the power supply circuit 600. An output winding Ns1-2 and the output winding Ns3 are connected to the cross capacitor $C_{cross701}$. The cross-regulation can be improved by the energy (voltage) balance effect of the cross capacitor $C_{cross701}$. Further, an output winding Ns2-2 and the output winding Ns3 are connected to the cross capacitor $C_{cross702}$. The cross-regulation can be improved by the energy (voltage) balance effect of the cross capacitor $C_{cross702}$.

In the seventh embodiment of the present invention, one of the output terminals is feedback-controlled and other two output terminals are not feedback-controlled. However, on the contrary, two output terminals may be feedback-controlled by using a value that is obtained by adding each of two output voltages with a predetermined rate and another output terminal may not be feedback-controlled. Alternatively, all of three output terminals may also be feedback-controlled by using the predetermined rate. In the power supply circuit 700 explained above, the cross-regulation can be improved by the energy (voltage) balance effect of the cross capacitors $C_{cross701}$ and $C_{cross702}$ in the same manner as the previous embodiment.

In the seventh embodiment of the present invention, the same polarity terminals (nodes 703 and 705) are directly connected by a wire. Further, the nodes 704 and 705 are connected via a capacitor C2. In the configuration explained above, the output terminals correspond to two positive (+) outputs and one negative (−) output, for instance, (+5V, −12V, +12V), (+5V, −15V, +15V). The nodes 703 and 705 may be connected via, for example, a capacitor, constant voltage supply, or a Zener diode. Further, the nodes 704 and 705 may also be connected via, for example, a capacitor, constant voltage supply, or a Zener diode. That is, it forms closed loops by connecting between the output winding Ns1-2 and the output winding Ns3 and between the output winding Ns2-2 and the output winding Ns3 via the cross capacitors $C_{cross701}$ and $C_{cross702}$ respectively.

Eighth Embodiment

Figure 15:
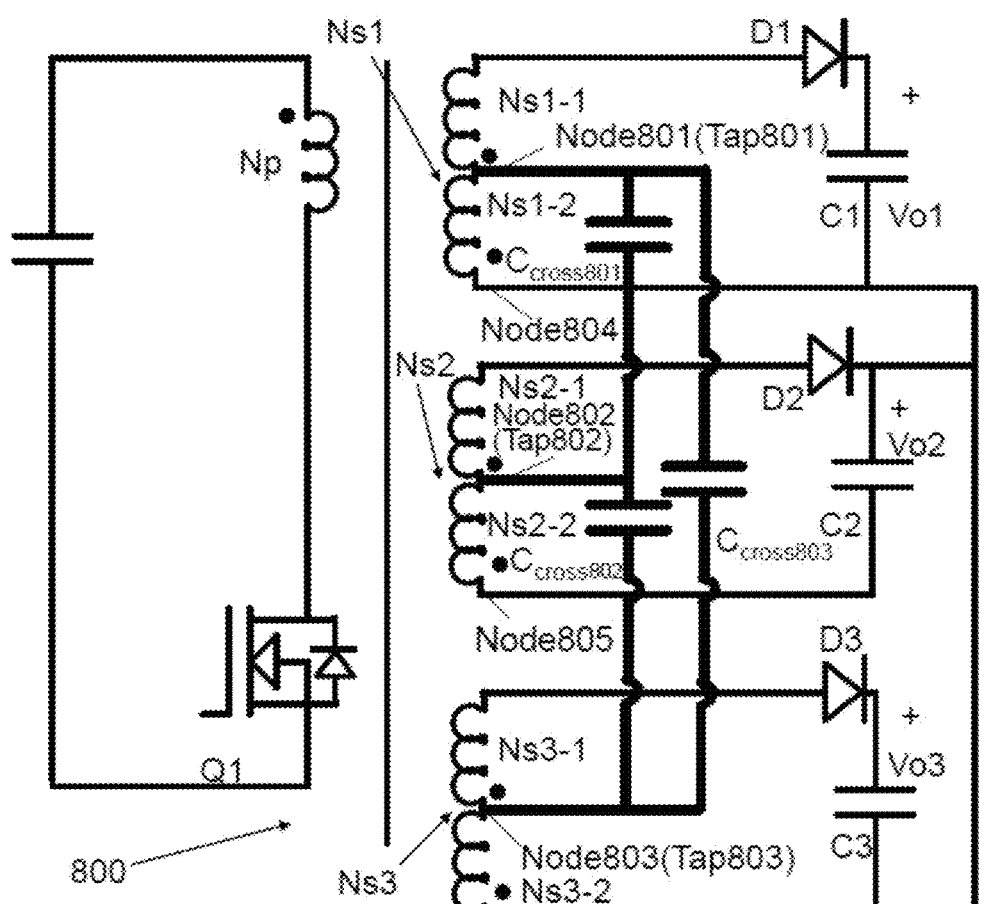
FIG. 15 is a circuit diagram that shows a power supply circuit 800 according to an eighth embodiment of the present invention.

FIG. 15 is a circuit diagram that shows a power supply circuit 800 according to an eighth embodiment of the present invention. In the power supply circuit 800 according to the eighth embodiment, the numbers and locations of the center taps and the cross capacitors are different from the power supply circuit 600. In this respect, the power supply circuit 800 is mainly different from the power supply circuit 600 according to the sixth embodiment of the present invention.

The power supply circuit 800 is configured with a primary winding Np, a first output winding (a secondary winding)

Ns1, a second output winding (a secondary winding) Ns2, a third output winding (a secondary winding) Ns3, a switching element Q1, a control circuit Ic (not shown), and rectifying devices (diodes) D1, D2 and D3. Specifically, the first output winding (the secondary winding) Ns1, the second output winding (the secondary winding) Ns2 and the third output winding (the third winding) Ns3 are coupled to one another. The switching element Q1 is connected in series to the primary winding Np. The control circuit Ic controls the switching element Q1. The rectifying device (the diode) D1 supplies electric power to a first output terminal Vo1. The rectifying device (the diode) D2 supplies electric power to a second output terminal Vo2. Further, the rectifying device (the diode) D3 supplies electric power to a third output terminal Vo3. In each of the three output windings Ns1, Ns2 and Ns3 that are coupled, each of three center taps Tap801-803 (nodes 801-803) is provided at a position that has the same numbers of output windings and the same polarity among the three output windings. A capacitor is connected between any two of the three center taps Tap801-803 (nodes 801-803). That is, in the power supply circuit 800, at least one capacitor is connected between any two of the nodes 801, 802 and 803.

An operation principle of the power supply circuit 800 is the same as the power supply circuit 600. An output winding Ns1-2 and an output winding Ns2-2 are connected to a cross capacitor $C_{cross801}$. The cross-regulation can be improved by the energy (voltage) balance effect of the cross capacitor $C_{cross801}$ The output winding Ns2-2 and an output winding Ns3-2 are connected to a cross capacitor $C_{cross802}$. The cross-regulation can be improved by the energy (voltage) balance effect of the cross capacitor $C_{cross802}$. Further, the output winding Ns1-2 and the output winding Ns3-2 are connected to a cross capacitor $C_{cross803}$. The cross-regulation can be improved by the energy (voltage) balance effect of the cross capacitor $C_{cross803}$.

Further, in the eighth embodiment of the present invention, the same polarity terminals (the nodes 804 and 805) are connected via a capacitor C2. Further, the same polarity terminals (the nodes 805 and 806) are connected via the capacitor C2. Further, the same polarity terminals (the nodes 804 and 806) are directly connected by a wire. In a configuration explained above, the output terminals correspond to two positive (+) outputs and one negative (−) output, for instance, (+5V, −12V, +12V), (+5V, −15V, +15V). The nodes 804 and 805 may be connected via, for example, a capacitor, constant voltage supply, or a Zener diode. The nodes 805 and 806 may also be connected via, for example, a capacitor, constant voltage supply, or a Zener diode. Further, the nodes 804 and 806 may also be connected via, for example, a capacitor, constant voltage supply, or a Zener diode. That is, it forms closed loops by connecting between the output winding Ns1-2 and the output winding Ns2-2, the output winding Ns2-2 and the output winding Ns3-2, and the output winding Ns1-2 and the output winding Ns3-2 via the cross capacitors $C_{cross801}$ through $C_{cross803}$ respectively, for example, as shown in FIG. 15.

Ninth Embodiment

Figure 16:
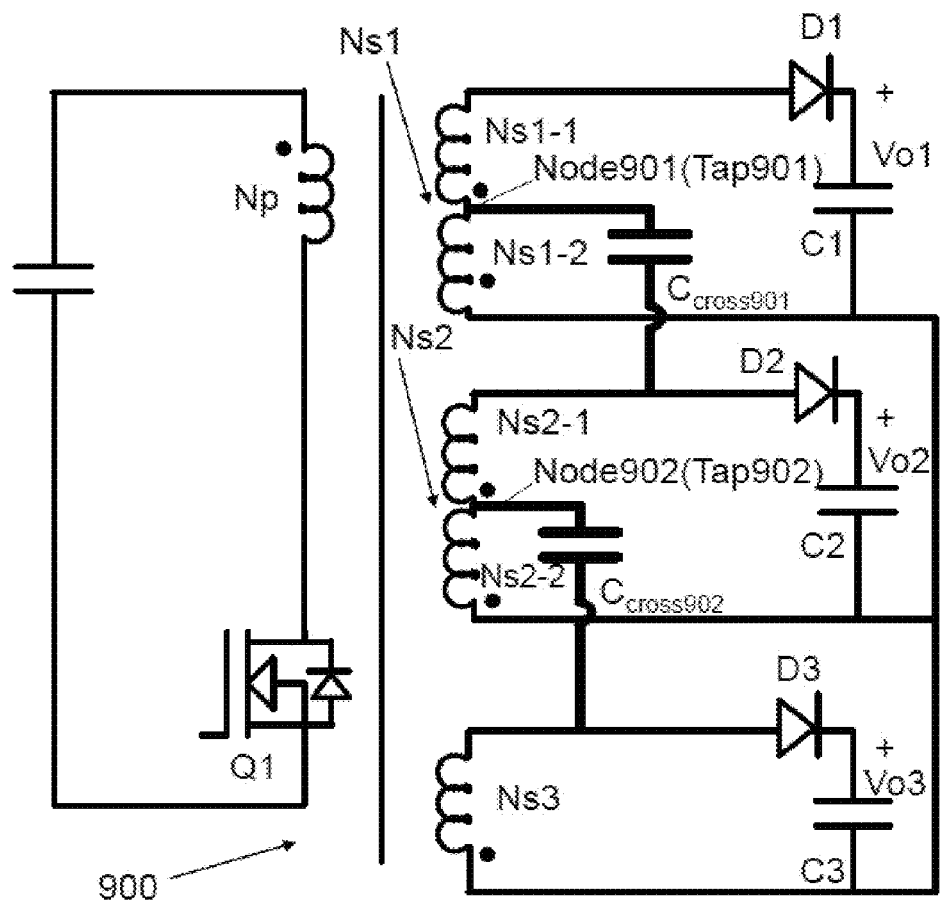
FIG. 16 is a circuit diagram that shows a power supply circuit 900 according to a ninth embodiment of the present invention.

FIG. 16 is a circuit diagram that shows a power supply circuit 900 according to a ninth embodiment of the present invention. In the power supply circuit 900 according to the ninth embodiment, the locations of center taps and cross capacitors are different from the power supply circuit 600. In this respect, the power supply circuit 900 is mainly different from the power supply circuit 600 according to the sixth embodiment of the present invention.

The power supply circuit 900 is configured with a primary winding Np, a first output winding (a secondary winding) Ns1, a second output winding (a secondary winding) Ns2, a third output winding (a secondary winding) Ns3, a switching element Q1, a control circuit Ic (not shown), and rectifying devices (diodes) D1, D2 and D3. Specifically, the first output winding (the secondary winding) Ns1, the second output winding (the secondary winding) Ns2 and the third output winding (the third winding) Ns3 are coupled to one another. The switching element Q1 is connected in series to the primary winding Np. The control circuit Ic controls the switching element Q1. The rectifying device (the diode) D1 supplies electric power to a first output terminal Vo1. The rectifying device (the diode) D2 supplies electric power to a second output terminal Vo2. Further, the rectifying device (the diode) D3 supplies electric power to a third output terminal Vo3. In the first output winding Ns1, a center tap Tap901 is provided at a position that has the same number of windings and the same polarity as the second output winding Ns2. Further, the center tap Tap901 and the second output winding Ns2 are connected via a cross capacitor $C_{cross901}$. In the second output winding Ns2, a center tap Tap902 is provided at a position that has the same number of windings and the same polarity as the third output winding Ns3. Further, the center tap Tap902 and the third output winding Ns3 are connected via a cross capacitor $C_{cross902}$.

An operation principle of the power supply circuit 900 is the same as the power supply circuit 600. An output winding Ns1-2 and the output winding Ns2 are connected to the cross capacitor $C_{cross901}$. The cross-regulation can be improved by the energy (voltage) balance effect of the cross capacitor $C_{cross901}$. Further, an output winding Ns2-2 and the output winding Ns3 are connected to the cross capacitor $C_{cross902}$. The cross-regulation can be improved by the energy (voltage) balance effect of the cross capacitor $C_{cross902}$.

According to the power supply circuit 900, a power supply circuit that has three outputs of 5V, 12V and 24V can be realized.

Tenth Embodiment

Figure 17:
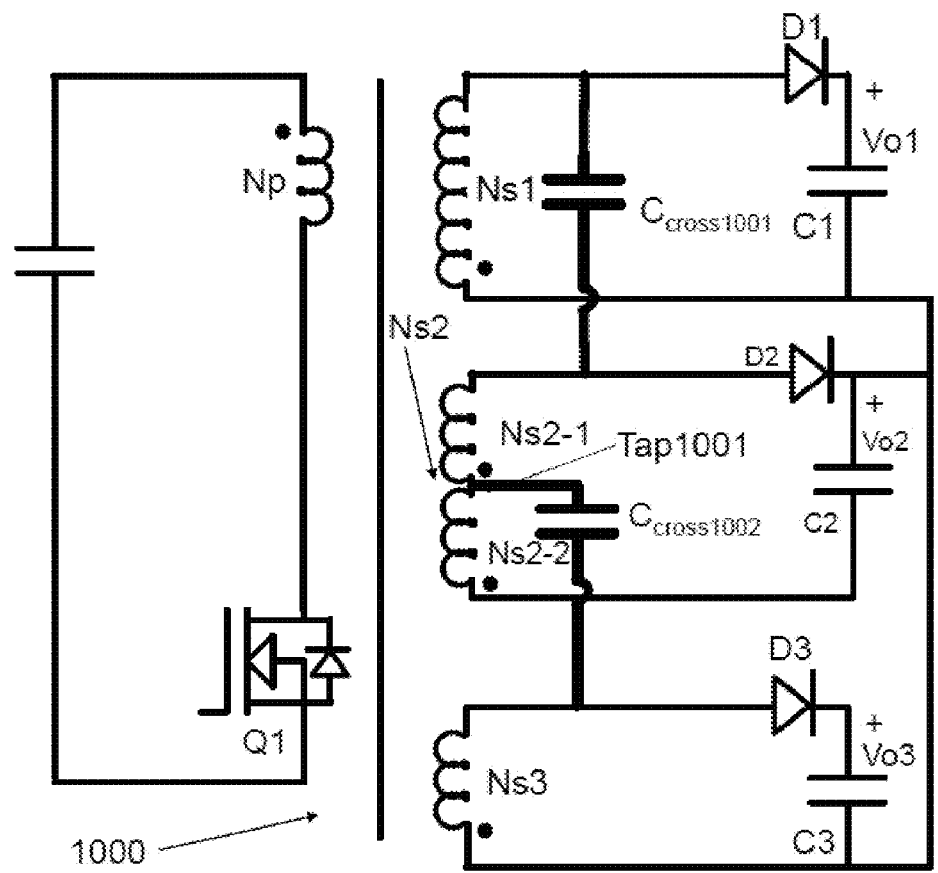
FIG. 17 is a circuit diagram that shows a power supply circuit 1000 according to a tenth embodiment of the present invention.

FIG. 17 is a circuit diagram that shows a power supply circuit 1000 according to a tenth embodiment of the present invention. In the power supply circuit 1000 according to the tenth embodiment, the numbers and locations of center taps and cross capacitors are different from the power supply circuit 600. In this respect, the power supply circuit 1000 is mainly different from the power supply circuit 600 according to the sixth embodiment of the present invention.

The power supply circuit 1000 is configured with a primary winding Np, a first output winding (a secondary winding) Ns1, a second output winding (a secondary winding) Ns2, a third output winding (a secondary winding) Ns3, a switching element Q1, a control circuit Ic (not shown), and rectifying devices (diodes) D1, D2 and D3. Specifically, the first output winding (the secondary winding) Ns1, the second output winding (the secondary winding) Ns2 and the third output winding (the third winding) Ns3 are coupled to one another. The switching element Q1 is connected in series to the primary winding Np. The control circuit Ic controls the switching element Q1. The rectifying device (the diode) D1 supplies electric power to a first output terminal Vo1. The rectifying device (the diode) D2 supplies electric power to a second output terminal Vo2. Further, the rectifying device (the diode) D3 supplies electric power to a third output terminal Vo3. The numbers of windings of the first output winding Ns1 and the second output winding Ns2 are the same. The same polarity terminals of the first output winding Ns1 and the second output winding Ns2 are connected via a cross capacitor $C_{cross1003}$. In the second output winding Ns2, a center tap Tap1001 is provided at a position that has the same number of windings and the same polarity as the third output winding Ns3. Further, the center tap Tap1001 and the third output winding Ns3 are connected via a cross capacitor $C_{cross1002}$.

An operation principle of the power supply circuit 1000 is the same as the power supply circuit 600. The output windings Ns1 and Ns2 are connected to the cross capacitor $C_{cross1001}$. The cross-regulation can be improved by the energy (voltage) balance effect of the cross capacitor $C_{cross1001}$. Further, an output winding Ns2-2 and the output winding Ns3 are connected to the cross capacitor $C_{cross1002}$. The cross-regulation can be improved by the energy (voltage) balance effect of the cross capacitor $C_{cross1002}$.

According to the power supply circuit 1000, a power supply circuit that has three outputs of 5V, ±12V or 5V, and ±15V can be realized.

Eleventh Embodiment

Figure 18A:
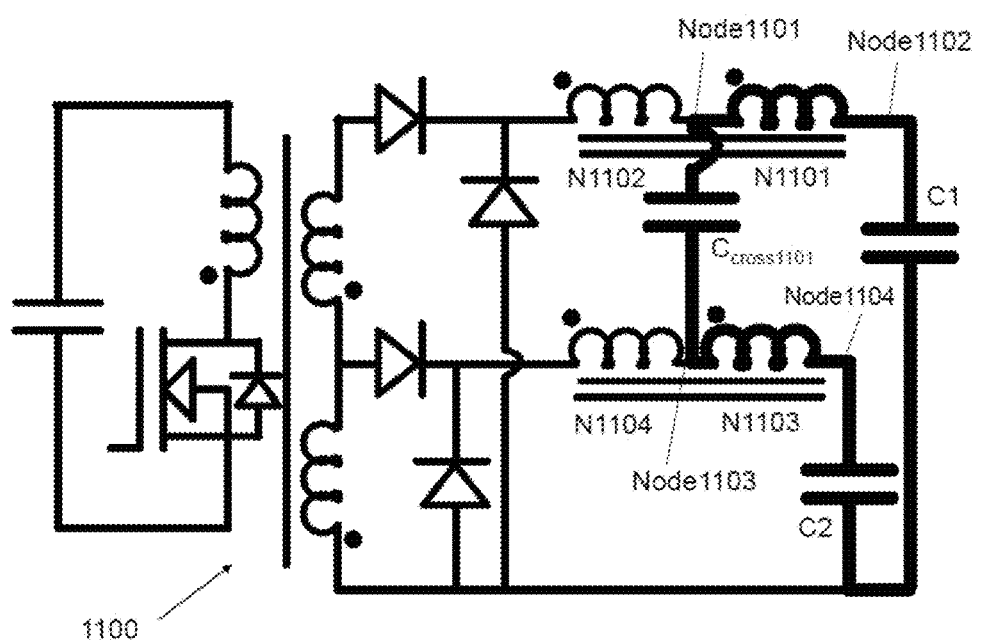
FIG. 18A is a circuit diagram that shows a power supply circuit 1100 according to an eleventh embodiment of the present invention.

FIG. 18A is a circuit diagram that shows a power supply circuit 1100 according to an eleventh embodiment of the present invention. In the eleventh embodiment, an output winding, which configures a transformer, is connected to a cross capacitor. However, the cross capacitor may also be connected to an output winding, which configures an output mutual inductance.

The power supply device 1100 according to the eleventh embodiment has the output mutual inductance that is configured with output windings N1101-N1104. Specifically, the number of windings of the output winding N1101 and the output winding N1103 are the same. A cross capacitor $C_{cross1101}$ connects the same polarity terminals of the output windings N1101 and N1103 (nodes 1101 and 1103). The other same polarity terminals (nodes 1102 and 1104) are electrically connected via output capacitors C1 and C2.

Because the cross capacitor $C_{cross1101}$ the output capacitors C1, C2 and the output windings N1101, N1103 compose a closed loop, a voltage difference between the output windings N1101 and N1103 decreases according to the energy (voltage) balance effect of the cross capacitor $C_{cross1101}$ in the same manner as the embodiments explained above. As a result, the cross-regulation between two output terminals can be improved.

Figure 18B:
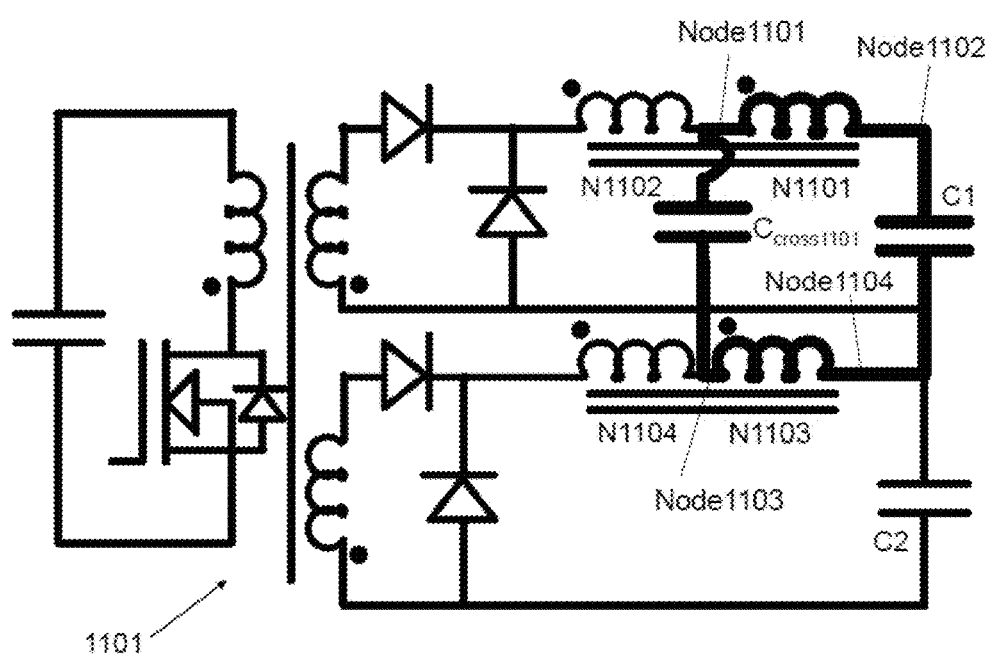
FIG. 18B is a circuit diagram that shows a power supply circuit 1101 related to a variation of the eleventh embodiment of the present invention.

FIG. 18B is a circuit diagram that shows a power supply circuit 1101 related to a variation of the eleventh embodiment of the present invention. The other same polarity terminals (the nodes 1102 and 1104) are connected via the capacitor C1. As a result, a power supply circuit that has one positive (+) output terminal and one negative (−) output terminal is realized. At the same time, the output winding N1101 and the output winding Ns1102 in which the number of windings are the same compose a closed loop via the capacitor C1 and the cross capacitor $C_{cross1101}$. As a result, a voltage difference between the two output terminals can be decreased and the cross-regulation can be improved.

Further, in the eleventh embodiment and the variation of the eleventh embodiment of the present invention, the number of windings of the output windings N1102 and Ns1104 may correspond to 0.

The power supply circuit being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims.

What is claimed is:

1. A power supply circuit, comprising:
   a plurality of output terminals that output voltages; and
   a transformer that has a plurality of output windings, the plurality of output windings including first and second output windings that are coupled to each other, wherein
   first terminals of the first and second output windings are connected to each other via a capacitor, and each of the first terminals has a first polarity,
   second terminals of the first and second output windings are electrically connected to each other, and each of the second terminals has a second polarity which is opposite to the first polarity, and
   the first and second output windings have the same number of turns between the first and second terminals.

2. The power supply circuit, according to claim 1, wherein the first output winding has a center tap to make a number of turns of the first output winding between the center tap and one of the first and second terminals of the first output winding be equal to a number of turns of the second output winding between the first and second terminals of the second output winding.

3. The power supply circuit, according to claim 1, wherein an additional winding is added to an original number of turns of the first output winding to make a sum of the original number of turns of the first output winding and the additional winding equal to a number of turns of the second output winding.

4. The power supply circuit, according to claim 1, wherein the first and second output windings respectively have first and second center taps as the first terminals.

5. The power supply circuit, according to claim 1, wherein at least one of the first and second output windings is performed by feedback control.

6. The power supply circuit, according to claim 1, wherein the power supply circuit is one of a flyback circuit and a forward circuit.

7. The power supply circuit, according to claim 1, wherein the plurality of output windings are output mutual inductances.

8. The power supply circuit, according to claim 1, wherein the second terminals are directly connected to each other.

9. The power supply circuit, according to claim 8, wherein the first output winding has a center tap to make a number of turns of the first output winding between the center tap and one of the first and second terminals of the first output winding be equal to a number of turns of the second output winding between the first and second terminals of the second output winding.

10. The power supply circuit, according to claim 8, wherein
    an additional winding is added to an original number of turns of the first output winding to make a sum of the original number of turns of the first output winding and the additional winding equal to a number of turns of the second output winding.

11. The power supply circuit, according to claim 8, wherein
    the first and second output windings respectively have first and second center taps as the first terminals.

12. The power supply circuit, according to claim 8, wherein
at least one of the first and second output windings is performed by feedback control.

13. The power supply circuit, according to claim 8, wherein
the power supply circuit is one of a flyback circuit and a forward circuit.

14. The power supply circuit, according to claim 8, wherein
the plurality of output windings are output mutual inductances.

15. A power supply circuit, comprising:
a plurality of output terminals that output voltages; and
a transformer that has a plurality of output windings, the output windings including first, second and third output windings that are coupled to each other, wherein
each of the first through third output windings has a first terminal and a second terminal, each of the first terminals has a first polarity, and each of the second terminals has a second polarity opposite to the first polarity, and
the first output winding has first and second center taps, each of the first and second center taps functioning as the first terminal,
the first terminal of the second output winding is connected to the first center tap via a first capacitor so that a number of turns of the second output winding is equal to a number of turns between the second terminal and the first center tap of the first output winding,
the first terminal of the third winding is connected to the second center tap via a second capacitor so that a number of turns of the third output winding is equal to a number of turns between the second terminal and the second center tap of the first output winding, and
the second terminals of the first through third output windings are electrically connected to each other.

16. The power supply circuit, according to claim 15, wherein
the second terminals of the first through third output windings are directly connected to each other.

17. The power supply circuit, according to claim 15, wherein
at least one of the first through third output windings is performed by feedback control.

\* \* \* \* \*